United States Patent Office 2,971,983
Patented Feb. 14, 1961

---

2,971,983

PRODUCTION OF ORGANO 2-HALO-1-PROPENYL KETONES

Joseph P. Henry, South Charleston, Robert M. Manyik, St. Albans, and Wellington E. Walker, Charleston, W. Va., assignors to Union Carbide Corporation, a corporation of New York No Drawing. Filed May 12, 1958, Ser. No. 734,438

11 Claims. (Cl. 260—592)

The present invention relates to organic processes, and in particular, to a process for the production of organo 2-halo-1-propenyl ketones having the general formula:

(I)
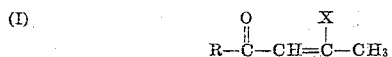
$$R-\overset{O}{\underset{\|}{C}}-CH=\overset{X}{\underset{|}{C}}-CH_3$$

wherein "R" represents a monovalent hydrocarbon radical and "X" represents a halogen atom. The term "hydrocarbon radical" as employed herein is meant to include or define both unsubstituted radicals and those possessing substitutents which are inert during the practice of this invention as described below, such as alkoxy, carbalkoxy groups, halogen atoms and the like.

The organo 2-halo-1-propenyl ketones produced by the process of this invention are well known and may find use in a number of diverse applications. By way of exemplification, these products can readily be converted by hydrolysis to the corresponding beta-diketones (organo 2-oxo-propyl ketones) as illustrated by the following general equation, wherein "R" and "X" represent monovalent hydrocarbon and halogen radicals respectively:

(II)
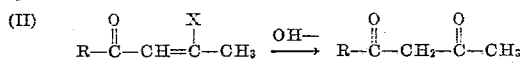
$$R-\overset{O}{\underset{\|}{C}}-CH=\overset{X}{\underset{|}{C}}-CH_3 \xrightarrow{OH^-} R-\overset{O}{\underset{\|}{C}}-CH_2-\overset{O}{\underset{\|}{C}}-CH_3$$

These beta-diketones, in turn, serve as efficient complexing agents, especially for polyvalent metal cations such as copper ions, and can be used, for example, in solvent extraction operations involving the separation of polyvalent metals and metal compounds. Thus, through the production of organo 2-halo-1-propenyl ketone intermediates by the process of this invention, a convenient source of beta-diketone complexing agents is made available. In addition, the products of this invention can also be used as intermediates for the synthesis of quinolines, isoxazoles and many other useful derivatives.

The invention is based upon our discovery that organo 2-halo-1-propenyl ketones can be prepared by the reaction of propadiene with a carboxylic acid halide in the presence of a Friedel-Crafts catalyst. The process of the invention may more clearly be illustrated by the following general equation, wherein "R" and "X" represent monovalent hydrocarbon and halogen radicals respectively:

(III)
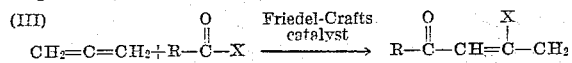
$$CH_2=C=CH_2 + R-\overset{O}{\underset{\|}{C}}-X \xrightarrow{\text{Friedel-Crafts catalyst}} R-\overset{O}{\underset{\|}{C}}-CH=\overset{X}{\underset{|}{C}}-CH_2$$

In the light of known processes involving cumulative or 1,2-dienoid systems, the reaction of propadiene with a carboxylic acid halide, as indicated above in Equation III, would ordinarily be expected to result in the production of an organo 2-halo-2-propenyl ketone, rather than the isomeric 1-propenyl ketone product described. We have unexpectedly found, however, that in accordance with the process of this invention, an organo 2-halo-1-propenyl ketone constitutes the major proportion of the product, while only relatively small amounts of the expected 2-propenyl ketone is actually formed or obtained.

More particularly, the carboxylic acid halides that are suitable for reaction with propadiene in the process of this invention can be represented by the general formula:

(IV)
$$R-\overset{O}{\underset{\|}{C}}-X$$

wherein "R" represents a monovalent hydrocarbon radical such as an alkyl, alkenyl, aryl, alkaryl, aralkyl, cycloalkyl, cycloalkaryl radical and the like, preferably containing from about 1 to about 10 carbon atoms, and "X" represents a halogen atom. In addition, these radicals can either be unsubstituted or substituted by inert substituents, such as alkoxy, carbalkoxy groups, halogen atoms, and the like. Especially good results can be obtained when the carboxylic acid utilized is a derivative of an alkanoic or benzoic acid, i.e., wherein "R" represents an alkyl or phenyl radical. Highly satisfactory results can also be obtained utilizing carboxylic acid halides wherein the halogen present is in particular chlorine.

Typical of the carboxylic acid halides that can be employed in the process of this invention are the following: acetyl chloride, acetyl bromide, butyryl chloride, butyryl bromide, isobutyryl chloride, pivalyl chloride, caproyl bromide, 2-ethylcaproyl chloride, enanthyl iodide, undecanoyl chloride, octadecanoyl chloride, 4-pentenoyl chloride, benzoyl chloride, benzoyl bromide, alpha-naphthoyl chloride, beta-naphthoyl chloride, para-methylbenzoyl chloride, phenylacetyl chloride, cyclohexylcarbonyl chloride, 4-cyclohexylbutyryl chloride, para-cyclohexylbenzoyl bromide, 5-nitrovaleryl chloride, para-nitrobenzoyl chloride, 4-ethoxybutyryl chloride, ortho-methoxybenzoyl chloride, 4-carbomethoxybutyryl chloride, para-carbomethoxybenzoyl chloride, 7-chloroenanthyl chloride, para-chlorobenzoyl chloride and the like.

Illustrative of the organo 2-halo-1-propenyl ketones that can be produced by the reaction of propadiene with a carboxylic acid halide in accordance with the process of this invention are the following: methyl 2-chloro-1-propenyl ketone, methyl 2-bromo-1-propenyl ketone, propyl 2-chloro-1-propenyl ketone, propyl 2-bromo-1-propenyl ketone, isopropyl 2-chloro-1-propenyl ketone, tertiary-butyl 2-chloro-1-propenyl ketone, pentyl 2-bromo-1-propenyl ketone, 1-ethylpentyl 2-chloro-1-propenyl ketone, hexyl 2-iodo-1-propenyl ketone, decyl 2-chloro-1-propenyl ketone, heptadecyl 2-chloro-1-propenyl ketone, 3-butenyl 2-cholor-1-propenyl ketone, phenyl 2-chloro-1-propenyl ketone, phenyl 2-bromo-1-propenyl ketone, alpha-naphthyl 2-chloro-1-propenyl ketone, beta-naphthyl 2-chloro-1-propenyl ketone, paramethylphenyl 2-chloro-1-propenyl ketone, phenylmethyl 2-chloro-1-propenyl ketone, cyclohexyl 2-chloro-1-propenyl ketone, 3-cyclohexylpropyl 2-chloro-1-propenyl ketone, para-cyclohexylphenyl 2-bromo-1-propenyl ketone, 4-nitrobutyl 2-chloro-1-propenyl ketone, para-nitrophenyl 2-chloro-1-propenyl ketone, 3-ethoxypropyl 2-chloro-1-propenyl ketone, ortho-methoxyphenyl 2-chloro-1-propenyl ketone, 3-carbomethoxypropyl 2-chloro-1-propenyl ketone, para-carbomethoxyphenyl 2-chloro-1-propenyl ketone, 6-chlorohexyl 2-chloro-1-propenyl ketone, para-chlorophenyl 2-chloro-1-propenyl ketone and the like.

Among the Friedel-Crafts catalysts suitable for use in the process of the invention are anhydrous metal halides such as stannic, aluminum, ferric, zinc, titanium, bismuth halides, and the like. While any of these metal halides can be employed with advantage to catalyze the reaction of propadiene and a carboxylic acid halide as herein described, the use of stannic and aluminum halides, and especially those having as the halogen component thereof a halogen of the same type as that possessed by the particular carboxylic acid halide undergoing reaction, is preferred. In the latter instance, the possibility of producing a mixed organo 2-halo-1-propenyl ketone product containing more than one type of halogen is at least diminished. In addition, especially good results can be obtained utilizing as the Friedel-Crafts catalyst a metal chloride.

In the practice of the present invention, the admixture of propadiene, carboxylic acid halide and catalyst can be performed in any convenient manner. For example, the carboxylic acid halide and catalyst is usually dissolved in an inert solvent and propadiene thereafter added or bubbled into the solution until absorption ceases. Alternatively, the catalyst can be added to the carboxylic acid halide either continuously or portion-wise with propadiene addition, or subsequent thereto, and the use of a solvent can be omitted. Another manner in which the process of the invention can be carried out lies in the dissolution of a quantity of propadiene in an inert solvent and the subsequent addition of carboxylic acid halide and catalyst to the solution. Under these conditions, it is generally desirable to introduce additional propadiene into the solution until absorption is no longer noted in order to insure the complete reaction of the carboxylic acid halide. Moreover, the catalyst can instead initially be incorporated into the solution containing the propadiene prior to the addition of carboxylic acid halide. It is to be understood, however, that the present invention is not limited by any particular method in which the admixture of reactants, catalysts and solvent, if employed, is performed.

The inert compounds in which the reactants are soluble, and which are therefore suitable for use as a solvent in the process of the invention, are exemplified by halocarbons such as carbon tetrachloride, chloroform, methylene dibromide, methylene dichloride, ethylene dichloride, and the like, which are liquid under the reaction conditions herein described. However, any other inert solvent for the reactants can also be employed with satisfactory effect. In the case of halo carbon solvents, it is preferred to use one having as the halogen component thereof a halogen of the same type as that possessed by the particular carboxylic acid halide undergoing reaction. The reason for this choice is the same as that given above with reference to the choice of metal halide catalyst; by selecting a carboxylic acid halide reactant, metal halide catalyst and halocarbon solvent, each containing the same halogen, the possibility of producing a mixed organo 2-halo-1-propenyl ketone product possessing more than one type of halogen is precluded.

In a preferred embodiment of the invention, the reaction temperature is maintained in the range of from about −5° C. to about 15° C. While increased reaction temperatures above this range can also be employed, the use of such elevated temperatures in the process of the invention is generally attended by the increased formation of undesirable tars, which renders the subsequent separation of the desired product progressively difficult. A corresponding decrease in the rate of reaction with decreasing temperature has been observed, and at temperatures of below about −30° C., the rate of reaction may decrease to such an extent that little or no production of organo 2-halo-1-propenyl ketones can be expected within a reasonable period of time.

The reaction temperature can conveniently be maintained within the desired range by conducting the reaction in a vessel containing one of the reactants, and which is cooled by suitable means such as an ice and alcohol bath. The other reactant is then introduced in the presence of a catalyst at a rate such that the temperature within the vessel does not deviate beyond the desired range during the exothermic reaction. A similar procedure can be followed regarding the rate of addition when the catalyst is subsequently introduced to a mixture or solution of the reactants.

At the reaction temperatures described above, and under atmospheric pressure, propadiene is present in the gaseous state. The concentration of propadiene that is required in accordance with the process of this invention is therefore usually determined by the addition of propadiene gas to the acid halide, either with or subsequent to the addition of catalyst, until the absorption of propadiene by the system ceases. Hence, this concentration is not narrowly critical. While the use of from about 0.5 mole to about 1 mole of propadiene per mole of carboxylic acid halide has been found to yield particularly good results, greater or lesser amount of either reactant can nevertheless be employed. For example, greater amounts of carboxylic acid halide can be employed as a solvent when propadiene is introduced to the carboxylic acid halide prior to the addition of catalyst. However, little practical advantage may be realized by the use of concentrations of less than about 0.1 mole or greater than about 3 moles of propadiene per mole of carboxylic acid halide. Moreover, at concentrations in excess of about 3 moles of propadiene per mole of carboxylic acid halide, the likelihood of propadiene polymerization increases, thereby introducing increased problems of product separation.

The concentration of Friedel-Crafts catalyst to be employed in the process of this invention similarly is not narrowly critical. The use of from about 0.5 mole to about 1 mole of catalyst per mole of carboxylic acid halide is preferred, with satisfactory results realizable using from about 0.1 mole to about 3 moles of catalyst per mole of carboxylic acid halide. As the concentration of catalyst is increased within this range, the product yield, based upon the amount of carboxylic acid halide employed, is advantageously affected, with optimum yields obtainable when approximately equimolar quantities of catalyst and acid halide are employed. Although concentrations of less than about 0.1 mole of catalyst per mole of carboxylic acid halide can be used in the process of the invention, the yield of organo 2-halo-1-propenyl ketone so produced generally is not sufficient to warrant the commercial application of the process. On the other hand, the advantage of higher product yields is not commensurate with the use of increased catalyst concentrations above about 2 moles of catalyst per mole of acid halide.

While the use of atmospheric pressure is particularly suitable to the present invention, operating pressures slightly above or below atmospheric pressure can also be utilized.

At the completion of the reaction between propadiene and the carboxylic acid halide, the organo 2-halo-1-propenyl ketone product can be recovered by any convenient means. For example, the reaction mixture can be poured into a mixture of ice and dilute hydrochloric acid, or a mixture of methanol and water. An organic layer and an aqueous layer are formed thereby and can be separated by decantation. The organic layer can then be washed successively with dilute hydrochloric acid, water and an aqueous sodium bicarbonate solution, and the organo 2-halo-1-propenyl ketone product separated therefrom by distillation at reduced pressure.

The following examples serve to illustrate the best modes of practicing this invention that are now contemplated. In the examples, the products were analyzed by conventional qualitative and quantitative methods such as derivative-formation, carbon, hydrogen and halogen determinations, boiling point and refractive index measurements and the like.

*Example 1*

Seventy-eight grams of acetyl chloride and 225 grams of stannic chloride were placed in a 4-necked, glass, round-bottom flask, fitted with a thermometer, a stirrer and gas inlet and outlet tubes. Agitation was applied and the temperature of the solution within the flask reduced to about 0° C. by immersing the flask in an ice and methanol bath. Propadiene was then bubbled into the cooled solution at a rate such that the temperature of the reaction mixture was maintained at about 0° C. The completion of the reaction was indicated by the failure of the reaction mixture to absorb further quantities of propadiene, at which point 29.3 grams of propadiene had been introduced to the system. The reaction mixture was then poured into a mixture of ice and hydrochloric acid, resulting in the formation of an organic and an aqueous layer. The organic layer was separated and washed successively with dilute hydrochloric acid, water and an aqueous sodium bicarbonate solution. Chemical analysis of the product, subsequently recovered from the organic layer by distillation at reduced pressure, indicated the presence of methyl 2-chloro-1-propenyl ketone in approximately a 22 percent yield based upon the weight of propadiene employed.

*Example 2*

Seventy-eight grams of acetyl chloride and 66 grams of aluminum chloride were placed in a 4-necked, glass, round-bottom flask, fitted with a thermometer, a stirrer and gas inlet and outlet tubes. Agitation was applied and the temperature of the solution within the flask reduced to about 0° C. by immersing the flask in an ice and methanol bath. Propadiene was then bubbled into the cooled solution at a rate such that the temperature of the reaction mixture was maintained within the range of from about 0° C. to about 10° C. The completion of the reaction was indicated by the failure of the reaction mixture to absorb further quantities of propadiene, at which point 9.2 grams of propadiene had been introduced to the system. The reaction mixture was then poured into a mixture of ice and hydrochloric acid, resulting in the formation of an organic and an aqueous layer. The organic layer was separated and washed successively with dilute hydrochloric acid, water and an aqueous sodium bicarbonate solution. Chemical analysis of the product, subsequently recovered from the organic layer by distillation at reduced pressure, indicated the presence of methyl 2-chloro-1-propenyl ketone in approximately a 37 percent yield based upon the weight of propadiene employed.

*Example 3*

Seventy-eight and one-half grams of acetyl chloride, 133.5 grams of aluminum chloride and 289 grams of chloroform were placed in a 4-necked, glass, round-bottom flask, fitted with a thermometer, a stirrer and gas inlet and outlet tubes. Agitation was applied and the temperature of the solution within the flask reduced to about 0° C. by immersing the flask in an ice and methanol bath. Propadiene was then bubbled into the cooled solution at a rate such that the temperature of the reaction mixture was maintained within the range of from about −5° C. to about 4° C. The completion of the reaction was indicated by the failure of the reaction mixture to absorb further quantities of propadiene, at which point 27.5 grams of propadiene had been introduced to the system. The reaction mixture was then poured into a mixture of ice and hydrochloric acid, resulting in the formation of an organic and an aqueous layer. The organic layer was separated and washed successively with dilute hydrochloric acid, water and an aqueous sodium bicarbonate solution. Chemical analysis of the product, subsequently recovered from the organic layer by distillation at reduced pressure, indicated the presence of methyl 2-chloro-1-propenyl ketone in approximately a 41 percent yield based upon the weight of propadiene employed.

*Example 4*

One hundred six and one-half grams of benzoyl chloride, 106.8 grams of aluminum chloride and 160 grams of carbon tetrachloride were placed in a 4-necked, glass, round-bottom flask, fitted with a thermometer, a stirrer and gas inlet and outlet tubes. Agitation was applied and the temperature of the solution within the flask reduced to about 0° C. by immersing the flask in an ice and methanol bath. Propadiene was then bubbled into the cooled solution at a rate such that the temperature of the reaction mixture was maintained at about 0° C. The completion of the reaction was indicated by the failure of the reaction mixture to absorb further quantities of propadiene, at which point 33 grams of propadiene had been introduced to the system. The reaction mixture was then poured into a mixture of ice and hydrochloric acid, resulting in the formation of an organic and an aqueous layer. The organic layer was separated and washed successively with dilute hydrochloric acid, water and an aqueous sodium bicarbonate solution. Chemical analysis of the product, subsequently recovered from the organic layer by distillation at reduced pressure, indicated the presence of phenyl 2-chloro-1-propenyl ketone in approximately a 67 percent yield based upon the weight of benzoyl chloride employed.

A similar run employing benzoyl bromide and propadiene as reactants, an aluminum bromide catalyst and carbon tetrachloride as solvent resulted in the production of a phenyl 2-halo-1-propenyl ketone product containing both bromine and chlorine atoms.

In another similar run employing 70 grams of benzoyl chloride, 28 grams of propadiene, 89 grams of anhydrous ferric chloride and 640 grams of carbon tetrachloride, chemical analysis of the product indicated the presence of phenyl 2-chloro-1-propenyl ketone in approximately a 28 percent yield based upon the weight of benzoyl chloride employed.

*Example 5*

One hundred six and one-half grams of benzoyl chloride and 196 grams of stannic chloride were placed in a 4-necked, glass, round-bottom flask, fitted with a thermometer, a stirrer and gas inlet and outlet tubes. Agitation was applied and the temperature of the solution within the flask reduced to about 0° C. by immersing the flask in an ice and methanol bath. Propadiene was then bubbled into the cooled solution at a rate such that the temperature of the reaction mixture was maintained within the range of from about 3° C. to about 12° C. The completion of the reaction was indicated by the failure of the reaction mixture to absorb further quantities of propadiene, at which point 68 grams of propadiene had been introduced to the system. The reaction mixture was then poured into a mixture of ice and hydrochloric acid, resulting in the formation of an organic and an aqueous layer. The organic layer was separated and washed successively with dilute hydrochloric acid, water and a dilute sodium hydroxide solution. Chemical analysis of the product, subsequently recovered from the organic layer by distillation at reduced pressure, indicated the presence of phenyl 2-chloro-1-propenyl ketone in approximately an 8 percent yield based upon the weight of benzoyl chloride.

Example 6

Eighty-one grams of 2-ethylcaproyl chloride, 67 grams of aluminum chloride and 160 grams of carbon tetrachloride were placed in a 4-necked, glass, round-bottom flask, fitted with a thermometer, a stirrer and gas inlet and outlet tubes. Agitation was applied and the temperature of the solution within the flask reduced to about 0° C. by immersing the flask in an ice and methanol bath. Propadiene was then bubbled into the cooled solution at a rate such that the temperature of the reaction mixture was maintained within the range of from about 0° C. to about 9° C. The completion of the reaction was indicated by the failure of the reaction mixture to absorb further quantities of propadiene, at which point 27.5 grams of propadiene had been introduced to the system. The reaction mixture was then poured into a mixture of ice and hydrochloric acid, resulting in the formation of an organic and an aqueous layer. The organic layer was separated and washed successively with dilute hydrochloric acid, water and an aqueous sodium bicarbonate solution. Chemical analysis of the product, subsequently recovered from the organic layer by distillation at reduced pressure, indicated the present of 1-ethylpentyl 2-chloro-1-propenyl ketone in approximately a 78.5 percent yield based upon the weight of 2-ethylcaproyl chloride employed.

Example 7

One-hundred-six grams of butyryl chloride, 133 grams of aluminum chloride and 320 grams of carbon tetrachloride were placed in a 4-necked, glass, round-bottom flask, fitted with a thermometer, a stirrer and gas inlet and outlet tubes. Agitation was applied and the temperature of the solution within the flask reduced to about 0° C. by immersing the flask in an ice and methanol bath. Propadiene was then bubbled into the cooled solution at a rate such that the temperature of the reaction mixture was maintained within the range of from about 5° C. to about 8° C. The completion of the reaction was indicated by the failure of the reaction mixture to absorb further quantities of propadiene, at which point 47 grams of propadiene had been introduced to the system. The reaction mixture was then poured into a mixture of ice and hydrochloric acid, resulting in the formation of an organic and an aqueous layer. The organic layer was separated and washed successively with dilute hydrochloric acid, water and an aqueous sodium bicarbonate solution. Chemical analysis of the product, subsequently recovered from the organic layer by distillation at reduced pressure, indicated the presence of propyl 2-chloro-1-propenyl ketone in approximately a 41 percent yield based upon the weight of butyryl chloride employed.

Example 8

Seventy-eight grams of acetyl chloride were placed in a 4-necked, glass, round-bottom flask, fitted with a thermometer, a stirrer and gas inlet and outlet tubes. The temperature of the liquid within the flask was reduced to about 0° C. by immersing the flask in an ice and methanol bath and 30 grams of propadiene then introduced thereto. The gas inlet tube was replaced by a dropping funnel and a solution containing 133.5 grams of aluminum chloride in 157.5 grams of acetyl chloride and 50 grams of chloroform was slowly added at a rate such that the temperature of the reaction mixture was maintained at about 0° C. The reaction mixture was then allowed to warm to a temperature of about 8° C. and poured into a mixture of ice and hydrochloric acid, resulting in the formation of an organic and an aqueous layer. The organic layer was separated and washed successively with dilute hydrochloric acid, water and an aqueous sodium bicarbonate solution. Chemical analysis of the product, subsequently recovered from the organic layer by distillation at reduced pressure, indicated the presence of methyl 2-chloro-1-propenyl ketone in approximately a 22 percent yield based upon the weight of propadiene employed.

Example 9

Seventy grams of benzoyl chloride and 256 grams of carbon tetrachloride were placed in a 4-necked, glass, round-bottom flask fitted with a thermometer, a stirrer, a gas outlet tube and a dropping funnel. Agitation was applied and the temperature of the solution within the flask reduced to about 0° C. by immersing the flask in an ice and methanol bath. Ninety-five grams of titanium tetrachloride were added thereto at a rate such that the temperature of the solution was maintained at about 0° C. The dropping funnel was replaced by a gas inlet tube and propadiene was then bubbled into cooled solution at a rate such that the temperature of the reaction mixture was maintained within the range of from about —9° C. to about 30° C. When 30 grams of propadiene had been added, the reaction mixture was poured into a mixture containing 60 milliliters of methanol and 100 milliliters of distilled water, resulting in the formation of an organic and aqueous layer. The organic layer was separated and distilled under reduced pressure. Chemical analysis of the product indicated the presence of phenyl 2-chloro-1-propenyl ketone in approximately a 30 percent yield based upon the weight of benzoyl chloride employed.

What is claimed is:

1. A process for the production of organo 2-halo-1-propenyl ketones which comprises reacting propadiene with a carboxylic acid halide having the general formula:

wherein "R" represents a monovalent hydrocarbon radical and "X" represents a halogen atom, in the presence of a catalytic amount of a Friedel-Crafts catalyst, and recovering the organo 2-halo-1-propenyl ketone product thereby formed.

2. A process as claimed in claim 1 wherein the hydrocarbon radical represented by "R" is an alkyl radical.

3. A process as claimed in claim 1 wherein the hydrocarbon radical represented by "R" is an alkyl radical containing from about 1 to about 10 carbon atoms.

4. A process as claimed in claim 1 wherein the hydrocarbon radical represented by "R" is a phenyl radical.

5. A process as claimed in claim 1 wherein the halogen atom represented by "X" is a chlorine atom.

6. A process for the production of organo 2-halo-1-propenyl ketones which comprises reacting propadiene with a carboxylic acid halide having the general formula:

wherein "R" represents a monovalent hydrocarbon radical and "X" represents a halogen atom, in a ratio of between about 0.5 mole and about 1 mole of propadiene per mole of carboxylic acid halide, in the presence of catalytic amounts of a Friedel-Crafts catalyst, at a reaction temperature of between about —5° C. and about 15° C., and recovering the organo 2-halo-1-propenyl ketone product thereby formed.

7. A process for the production of organo 2-halo-1-propenyl ketones which comprises reacting propadiene with a carboxylic acid halide having the general formula:

wherein "R" represents a monovalent hydrocarbon radical and "X" represents a halogen atom, in a ratio of between about 0.5 mole and about 1 mole of propadiene per mole of carboxylic acid halide, in the presence of an inert solvent and catalytic amounts of a Friedel-Crafts catalyst selected from the group consisting of stannic and aluminum halides, at a reaction temperature of between about —5° C. and about 15° C., and recovering the organo 2-halo-1-propenyl ketone product thereby formed.

8. A process as claimed in claim 7 wherein the hydrocarbon radical represented by "R" is an alkyl radical.

9. A process as claimed in claim 7 wherein the hydrocarbon radical represented by "R" is an alkyl radical containing from about 1 to about 10 carbon atoms.

10. A process as claimed in claim 7 wherein the hydrocarbon radical represented by "R" is a phenyl radical.

11. A process as claimed in claim 7 wherein the halogen radical represented by "X" is a chlorine atom.

References Cited in the file of this patent

UNITED STATES PATENTS

| | | |
|---|---|---|
| 1,737,203 | Schoeller et al. | Nov. 26, 1929 |
| 2,137,664 | Bayer et al. | Nov. 22, 1938 |
| 2,355,703 | Byrns | Aug. 15, 1944 |

OTHER REFERENCES

McMahon et al.: J. Am. Chem. Soc., vol. 70, pages 2971–4 (1948).